J. L. ZANDER.
ELECTRICAL MEASURING INSTRUMENT.
APPLICATION FILED SEPT. 28, 1910.
1,034,945.
Patented Aug. 6, 1912.
3 SHEETS—SHEET 3.
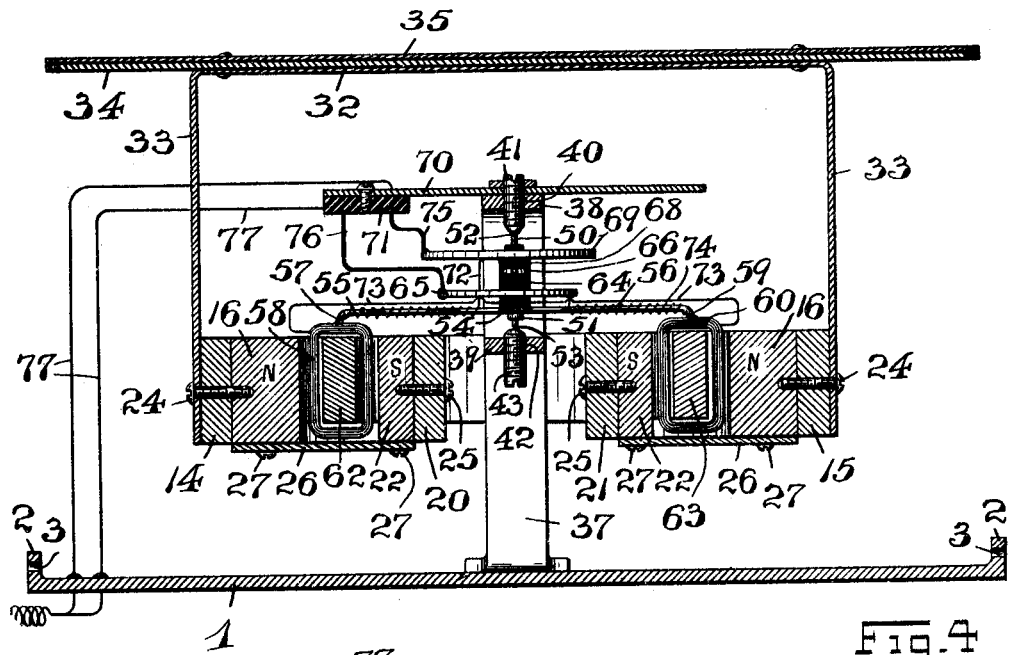
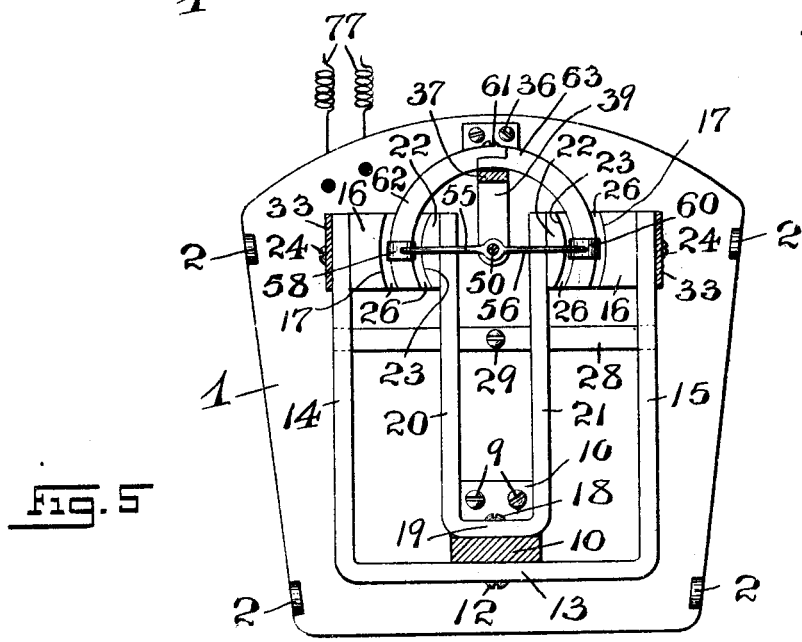
WITNESSES:
Frdk. W. Fraentzel
Harry E. Pfeiffer
INVENTOR:
John L. Zander
BY
Fraentzel and Richards
ATTORNEYS

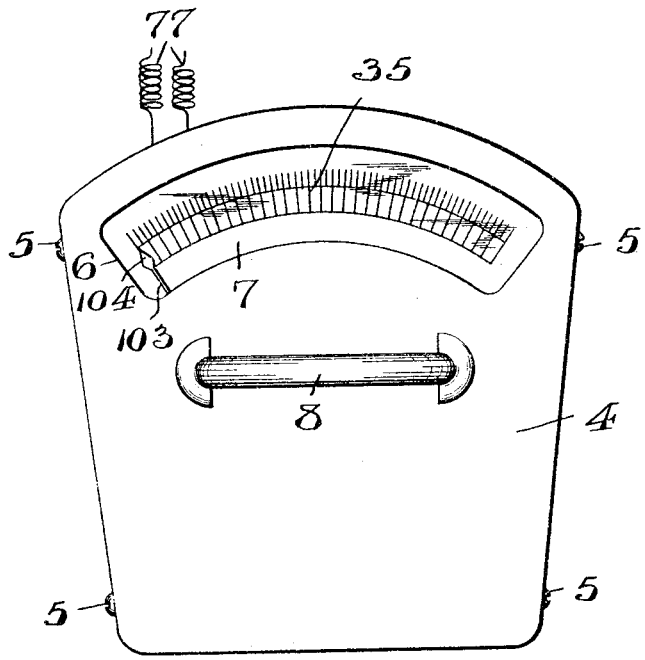
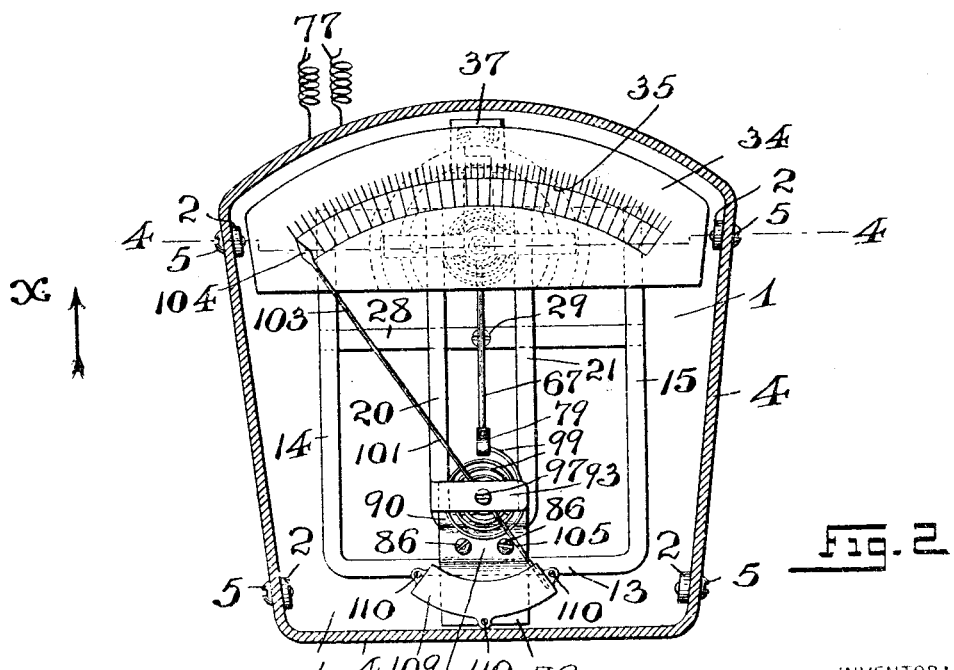

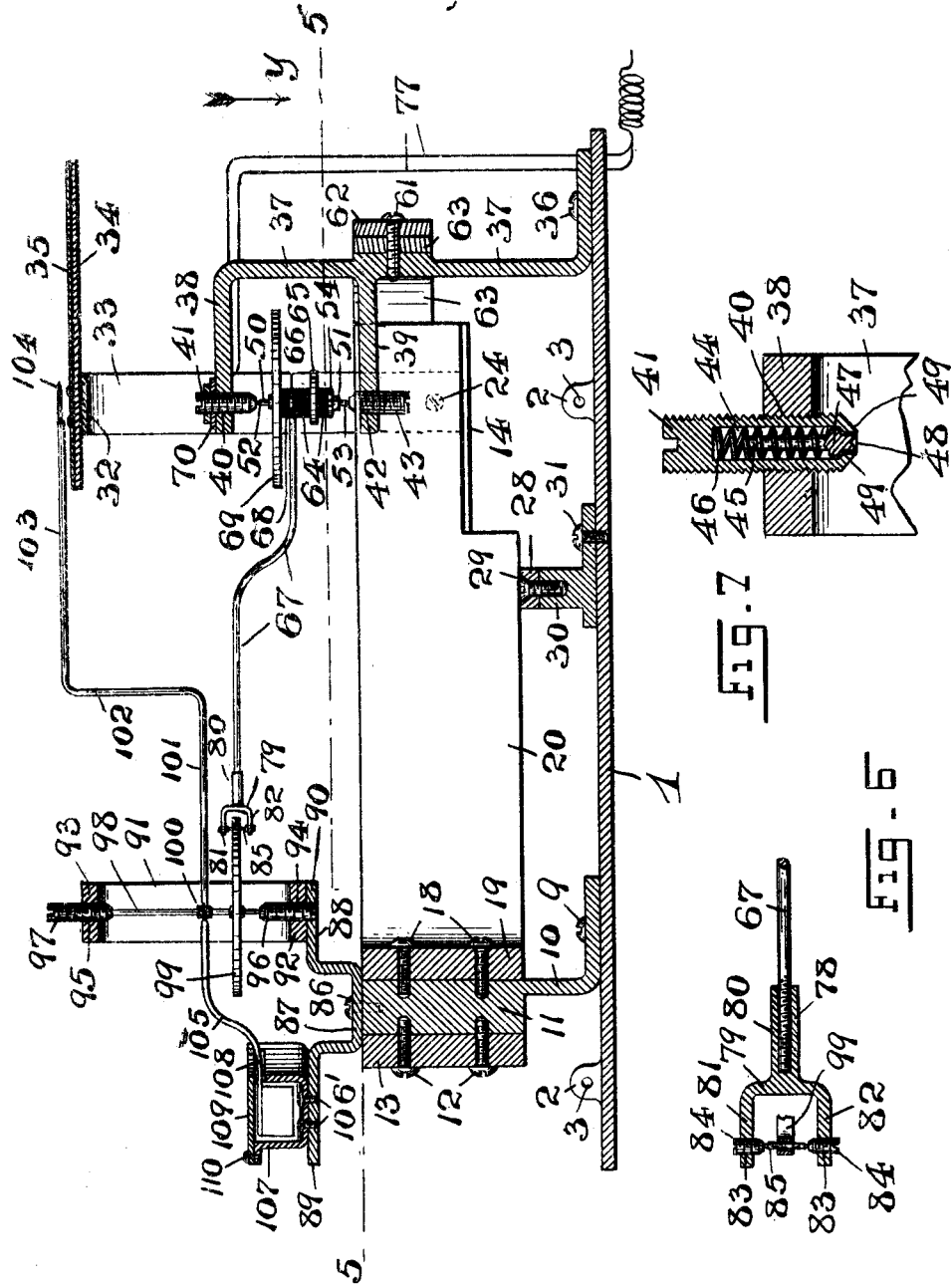

UNITED STATES PATENT OFFICE.

JOHN L. ZANDER, OF IRVINGTON, NEW JERSEY.

ELECTRICAL MEASURING INSTRUMENT.

1,034,945.

Specification of Letters Patent.

Patented Aug. 6, 1912.

Application filed September 28, 1910. Serial No. 584,188.

*To all whom it may concern:*

Be it known that I, JOHN L. ZANDER, a citizen of the United States, residing at Irvington, in the county of Essex and State of New Jersey, have invented certain new and useful Improvements in Electrical Measuring Instruments; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in electrical measuring devices; and, the present invention has for its principal object to provide a novel and simply constructed galvanometer the various devices and parts of which are arranged in a compact manner, and are reduced to a minimum, the energizing coils while moving in the fields of the magnets having a large leverage with relation to their pivotal support, so that the least movement of the coils will cause a correspondingly increased movement of the coil-supporting spindle or stem and the arm extending therefrom, the said arm producing a corresponding movement of the compensating spring which is connected with the index-hand of the supporting spindle or stem, so that the action of the measuring device is very delicate, and the least increase or decrease in the degrees of heat, or the like, is designated upon the scale and rendered more readily readable.

Other objects of this invention not at this time more particularly mentioned will be clearly understood from the following description of the same.

With the various objects of the present invention in view, the said invention consists, primarily, in the novel electrical measuring device or instrument hereinafter set forth; and the invention consists, furthermore, in the novel arrangements and combinations of the various devices and parts, as well as in the details of the construction of the same, all of which will be hereinafter more fully described, and then finally embodied in the clauses of the claims, which are appended to and which form an essential part of this specification.

The invention is fully illustrated in the accompanying drawings, in which:—

Figure 1 is a plan or top view of a portable electrical measuring instrument showing one embodiment of the principles of the present invention; and Fig. 2 is a horizontal sectional representation of the inclosing body or case of the apparatus or instrument, the mechanism within said case being represented in plan or top view. Fig. 3 is a central longitudinal vertical section of the device, said section being made on an enlarged scale, the top-cover which forms the casing of the device being omitted from this view; Fig. 4 is a transverse vertical section of the device, said section being taken on line 4—4 in Fig. 2 of the drawings, looking in the direction of the arrow $x$, said section being also made on an enlarged scale; and Fig. 5 is a horizontal sectional representation of the device, said section being made on line 5—5 in said Fig. 3, looking in the direction of the arrow $y$, and the said section being made on a reduced scale. Fig. 6 is a detail vertical sectional representation of one method of connecting the arm which extends from the main oscillatory spindle or stem with the compensating spring of the index-hand carrying spindle; and Fig. 7 is a detail vertical sectional representation of one of the bearings which is employed with any one of the said spindles, said Figs. 6 and 7 being both made on considerably enlarged scales.

Similar characters of reference are employed in all of the above described views, to indicate corresponding parts.

Referring now to the said drawings, the reference-character 1 indicates a suitable base, which may be of any marginal configuration, and may be provided at suitable points near its edges with upwardly extending ears or lugs 2, said lugs or ears being provided with screw-threaded holes 3. Suitably arranged upon the said base 1 is a cover, as 4, the sides of which register with the said lugs or ears, in substantially the manner shown in said Figs. 2 and 3 of the drawings, being suitably secured thereto by means of screws or pins 5. In its upper face, the said cover is formed at a desirable point with a suitably shaped reading opening 6, back of which is a glass, as 7, which is suitably secured in the inner side of the upper face of said cover. The said core may also be provided with a suitably formed handle 8, for handling and carrying about the box or case which is formed, when the said cover 4 is secured to said base 1 in the manner hereinabove set forth. Suitably secured to the said base 1 by means of screws 9, or any other suitable fastening means, is a post or support 10 which is formed with an enlarged portion as 11, to which is secured by means of screws 12, or other suitable fastening means, the neutral portion of a horse-shoe magnet 15. This magnet comprises a pair of arms or members 14 and 15, each arm being provided at or near its free end-portion with a pole-piece 16, each pole-piece being made with the concave surface-portion 17. In like manner, there is secured to said enlarged portion 11, of the said post or support 10, by means of screws 18 the neutral portion of a second horse-shoe magnet, said second magnet being disposed between the arms or members 14 and 15 of the first-mentioned horse-shoe magnet 13, the said horse-shoe magnet 19 comprising the arms or members 20 and 21, each arm or member being provided at or near its free end-portion with a pole-piece 22, and each pole-piece 22 being made with the convex surface portion 23, each convex surface portion 23 is located opposite one of the concave surface-portion 17 as clearly illustrated in Fig. 5 of the drawings.

The pole-pieces 16 are secured to the respective arms of the magnet 13, by means of screws 24, and the said pole-pieces 22 of the magnet 19 are secured to the respective arms thereof by means of screws 25. It will be understood, however, that the various pole-pieces may be otherwise connected with the arms of the respective magnets. As shown more particularly in Fig. 4 of the drawings, the respective pole-pieces 16 and 22 are connected in pairs upon their under surfaces by means of suitable plates 26, said plates being secured in place by means of screws 27; but, it will be understood that any other suitable fastening means may be employed if found desirable. The various arms or members 14 and 15, and 20 and 21, of the two horse-shoe magnets 13 and 19 may also rest and may be supported upon a cross-bar 28, said bar 28 being secured by means of a screw 29, or other suitable fastening means, to a post 30, which is secured by means of a screw 31, or other suitable fastening means, upon the base 1.

Referring now to Figs. 3 and 4 of the drawings, it will be seen, that there is secured to the arms or members 14 and 15 of the horse-shoe magnet 13, by means of the previously mentioned screws 24 the downwardly extending leg-portions or arms 33 of a supporting-plate 32. This plate is located below the reading opening 6 hereinabove mentioned, and carries a member or element 34, which is suitably secured upon the said plate 32, and has a scale or other suitable divisions or graduations 35 formed thereon, as clearly represented in Fig. 1 of the drawings. Secured to the said base 1 by means of screws 36, or in any other suitable manner, is a bracket 37, the said bracket being provided with a pair of forwardly extending arms or bearing-members 38 and 39, the said arm or bearing-member 38 being provided with a screw-threaded hole 40 in which is adjustably arranged a screw-threaded bearing-plug 41. In a like manner, the said arm 39 is provided with a screw-threaded hole 42 in which is arranged a screw-threaded plug 43.

Referring now more particularly to the detailed view of Fig. 7 of the drawings it will be seen, that each bearing-plug is made with a chambered portion 44, in which is movably arranged a stem 45 surrounded by a coil-spring 46. The stem 45 is provided with a bearing-head 47 which is formed with a cone-shaped seat 48, the said stem and its bearing-head being operatively retained within the chambered bearing-plug by the turned-in portion 49 of the plug, against which the annular shouldered part of the head 47 bears, substantially as shown in said Fig. 7 of the drawings. The said bearing-plug 43 is provided with a correspondingly disposed and similarly constructed spring-controlled stem, and bearing-head forming part of said stem. Oscillatorily mounted between the bearing-heads of the stems arranged in the said respective bearing-plugs 41 and 43 is a vertical spindle or stem 50. The spindle or stem 50 is provided with an annular shoulder or flange 51 and is made with pivots or pointed end-portions 52 and 53 which rest lightly in the cone-shaped seats of the respective bearing-heads movably disposed in the socketed and adjustable bearing-plugs 41 and 43, so that the said spindle or stem 50 and the parts connected therewith will have a free oscillatory movement, as will be clearly evident. Suitably secured upon said spindle or stem 50, so as to oscillate therewith, is an eye-portion 54, and extending from the opposite edge-portions thereof are suitable carriers or arms 55 and 56. Extending downwardly from the free end of said arm 55 is an extension 57 which carries a suitable wire-wound energizing coil 58; and, in like manner, extending downwardly from the free end of the arm 56 is an extension 59 which carries a suitable wire-wound energizing coil 60. Suitably secured to the bracket or post 37, by means of a screw 61, or other suitable fastening means, are a pair of segmental members or elements 62 and 63, the free end-portion of the member 62 extending into and terminating in the arc-shaped space formed between the concave surface-portion 17 of the pole-piece 16 of the magnet-arm 14 and the convex surface-portion 23 of the pole-piece 22 of the magnet-arm 20; and, the free end-portion of the member 63 extending into and terminating in the arc-shaped space formed between the concave surface-portion 17 of the pole-piece 16 of the magnet-arm 15 and the convex surface-portion 23 of the pole-peace 22 of the magnet-arm 21. As shown, the coil 58 encompasses and is movably disposed upon the free end-portion of the segmental member or element 62, and the coil 60 encompasses and is movably disposed upon the free end-portion of the segmental member or element 63. Suitably disposed upon said spindle or stem 50 above the said eye-portion 54 is a sleeve 64 of insulating material to which is secured the inner end-portion of a torsional or spiral spring 65, and secured above the said insulating sleeve 64 is another eye-portion 66 from which projects a forwardly extending arm or rod 67. Above this latter eye-portion 66 is another sleeve 68 of insulating material to which is secured the inner end-portion of another torsional or spiral spring 69. A plate or bar 70 is secured upon the upper arm 38 of the standard or post 37 by means of the previously mentioned screw-plug 41, the plate or bar 70 having secured at one end a piece of insulating material 71. Connected with and extending from a portion of the spring 69 is a suitably covered or insulated circuit-wire 72, a portion of which may be wound around the arm 55 and the extension 57, and connected with the coil 59. The reference-character 73 indicates a suitably covered or insulated circuit-wire leading from the end of said coil 58 to and being connected at its other end with the coil 60. The end of this last-mentioned coil 60 is connected by means of a suitably covered or insulated circuit-wire 74, which may be wound around the arm 56, with the spring 65. Circuit-wires 75 and 76 lead from the respective springs 69 and 65 to the insulating block or piece 71, the ends of said circuit-wires 75 and 76 being connected with the respective end-portions of a main circuit-wire 77 in which a thermo-electric couple is adapted to be located, and the said wires 75 and 76 being slightly heavier than the other wires used, so as to serve as suitable abutments for the ends of the springs 65 and 69.

Referring now to Figs. 3 and 6, it will be seen that the previously mentioned and forwardly extending arm or rod 67 has a screw-threaded end-portion 78 which is screwed into a screw-threaded receiving socket 80 of a yoke or stirrup-shaped connecting device 79. This device 79 comprises a pair of arms 81 and 82, said arms being provided with screw threaded holes 83 in each of which is screwed an adjustable bearing-plug 84. These plugs 84 are similar in construction to the bearing-plugs 41 and 43 hereinbefore mentioned. The pivots or pointed end-portions of a short spindle or stem 85 are oscillatorily arranged and supported between the cone-shaped bearing-portions of said bearing-plugs 84, as will be clearly evident. Suitably mounted upon the upper surface of the said enlarged portion 11 of the bracket or post 10, and secured thereto by means of screws 86, or other suitable fastening means, is a plate 87, said plate forming a bracket, and being provided with a rearwardly extending supporting member 88 and a forwardly extending supporting member 89. The said supporting member 88 is formed with a screw-threaded hole 90, and mounted upon said member 88 is a [-shaped support or bracket 91. This support or bracket 91 has a pair of arms 92 and 93, the arm 92 being formed with a screw-threaded hole 94 and the arm 93 with a screw-threaded hole 95. Suitably screwed in the screw-threaded holes 90 and 94 is a bearing-plug 96, said plug 96 being used also to secure the support or bracket 91 in its operative position upon the supporting member 88, and screwed into the screw-threaded hole 95 is a bearing-plug 97. These bearing-plugs 96 and 97 are also similar in construction to the bearing-plugs 41 and 43. The pivots or pointed end-portions of an oscillatory spindle or stem 98 are oscillatorily arranged and supported between the cone-shaped bearing-portions of these bearing-plugs 96 and 97. The oscillatory movements of this spindle or stem 98 are produced by a spiral-spring 99 which has its inner end-portion secured to said spindle or stem 98 and has its outer end-portion attached to the spindle or stem 85. By this means, the slightest movement of the arm or rod 67 will be communicated directly to said spindle or stem 98. Suitably secured upon the said spindle 98 is a fixed sleeve or collar 100 from which extends an index-hand 101. This hand has a suitably bent part 102 terminating in a finger 103 which is movably arranged above the previously mentioned plate 34 and the scale or other suitable graduation 35 thereon, the said hand being provided with a pointer 104 which moves directly over the divisions or graduations of the said scale. That the index-hand 101 and the parts connected therewith may be properly balanced the said sleeve or collar has extending therefrom, an arm-portion 105, which is preferably provided upon its free end-portion with a balancing wing or vane 106, as clearly indicated in the dotted outline in Fig. 3 of the drawings. That the oscillatory movements of the said index hand may not be influenced or counteracted by outside atmospheric conditions, such as drafts, or wind, the previously-mentioned rearwardly extending supporting member 88 has suitably secured thereon by means of screws or rivets 106' an arc-shaped box or casing 107, which is provided with a slotted portion 108 and a cover 109, suitably secured thereon by means of screws 110, or other suitable fastening means. As shown in said Fig. 3, the arm-portion 105 extends into and is movably arranged in the slotted part 108, so as not to interfere with the oscillatory movement of the index-hand, the said balancing wing or vane being arranged directly within and moving in the said box or casing 107 as will be clearly evident.

Having thus in a general way described the construction of an electrical measuring device showing one embodiment of the principles of the present invention, I will now briefly set forth its operation. Under normal initial conditions, when the apparatus is not in use, the various parts are in such relative positions, at rest, so that the pointer of the index-hand will lie directly over the zero graduation. As soon, however, as the instrument is put in circuit by connecting the ends of the wires 77 to a thermo-electric couple, or other electricity-producing source, a complete electric circuit will be established through the main circuit 77, the circuit-wire 76, the spring 65, the wire 74, the coil 60, the wire 73, coil 58, the wire 55, the spring 69, and the wire 75 back through the circuit 77 to the generating source. The result is that the coils 58 and 60 become energized, and will thereby be caused to move in opposite directions upon the respective members 62 and 63, and respectively between the pairs of pole-pieces 16 and 22 of the respective horse-shoe magnets 13 and 19, as will be clearly evident from an inspection from Figs. 4 and 5 of the drawings. This oscillating movement of the said coils and the corresponding movements of the arms 55 and 56 will produce an oscillation of the spindle 50 between its bearings, so that the forwardly extending rod or arm 67 is accordingly also moved and oscillated. At the same time the oscillatory movements of the said arm or rod 67 by means of the previously mentioned compensating spring 99 produces an oscillation of the spindle 98 between its bearings and the pointer of the index-hand will accordingly move along the scale for proper indication, as will be clearly understood. Thus it will be evident that the slightest movement of the arm or rod 67 is immediately conveyed to the index-hand so as to produce a very delicate and easily readable instrument for the purposes of the present invention. As soon as the current-producing source has again been cut out of the main circuit, the springs 65 and 69 will mechanically assume their normal positions and instrument to their initial positions with the pointer of the index-hand again at zero.

I am aware that some changes may be made in the arrangements and combinations of the various devices and parts, as well as in the details of the construction of the same, without departing from the scope of this invention as described in the foregoing specification and as defined in the clauses of the claims which are appended thereto. Hence, I do not limit my present invention to the exact arrangements and combinations of the devices and parts as set forth in the said specification, nor do I confine myself to the exact details of the construction of the said parts as illustrated in the accompanying drawings.

I claim:

1. In an electric measuring instrument, a pair of horse-shoe magnets, one of said magnets being larger than the other magnet, the smaller magnet being disposed between the pole-arms of the larger magnet, pole-pieces carried by the respective pole-arms of said magnets, said pole-pieces being arranged in pairs and having a space between each pair of said pole-pieces, a wire-wound coil movably disposed in each space between said pairs of pole-pieces, means for supporting said coils, a forwardly extending arm actuated from said coils, an oscillatory index hand, and a spiral spring between said forwardly extending arms and said index hand for actuating said index-hand.

2. In an electric measuring instrument, a pair of horse-shoe magnets, one of said magnets being larger than the other magnet, the smaller magnet being disposed between the pole-arms of the larger magnet, pole-pieces carried by the respective pole-arms of said magnets, said pole-pieces being arranged in pairs and having a space between each pair of said pole-pieces, a wire-wound coil movably disposed in each space between said pairs of pole-pieces, means for supporting said coils, a forwardly extending arm actuated from said coils, a stirrup-shaped member connected with said arm, a spindle oscillatorily mounted in said stirrup-shaped member, an oscillatory index-hand, and means between said spindle and said index hand for actuating said index-hand.

3. In an electric measuring instrument, a pair of horse-shoe magnets, one of said magnets being larger than the other magnet, the smaller magnet being disposed between the pole-arms of the larger magnet, pole-pieces carried by the respective pole-arms of said magnets, said pole-pieces being arranged in pairs and having a space between each pair of said pole-pieces, a wire-wound coil movably disposed in each space between said pairs of pole-pieces, means for supporting said coils, a forwardly extending arm actuber connected with said arm, a spindle oscillatorily mounted in said stirrup-shaped member, an oscillatory index hand, and a spiral spring between said spindle and said index-hand for actuating said index hand.

4. In an electric measuring instrument, a pair of horse-shoe magnets, one of said magnets being larger than the other magnet, the smaller magnet being disposed between the pole-arms of the larger magnet, pole-pieces carried by the respective pole-arms of said magnets, said pole-pieces being arranged in pairs and having a space between each pair of said pole-pieces, a standard provided with a pair of forwardly extending arms, bearing-lugs connected with said arms, an oscillatory spindle mounted between said bearing-lugs, coil-supporting arms extending laterally on opposite sides of said spindle, a wire-wound coil connected with each coil-supporting arm, each coil being movably disposed in a space between each pair of pole-pieces, and an index hand actuated through the movements of said coils.

5. In an electric measuring instrument, a pair of horse-shoe magnets, one of said magnets being larger than the other magnet, the smaller magnet being disposed between the pole-arms of the larger magnet, pole-pieces carried by the respective pole-arms of said magnets, said pole-pieces being arranged in pairs and having a space between each pair of said pole-pieces, a standard provided with a pair of forwardly extending arms, bearing-lugs connected with said arms, an oscillatory spindle mounted between said bearing-lugs, coil-supporting arms extending laterally on opposite sides of said spindle, a wire-wound coil connected with each coil-supporting arm, each coil being movably disposed in a space between each pair of pole-pieces, a forwardly extending arm connected with said spindle, an oscillatory index-hand, and a spiral spring between said forwardly extending arm and said index hand for actuating said index-hand.

6. In an electric measuring instrument, a pair of horse-shoe magnets, one of said magnets being larger than the other magnet, the smaller magnet being disposed between the pole-arms of the larger magnet, pole-pieces carried by the respective pole-arms of said magnets, said pole-pieces being arranged in pairs and having a space between each pair of said pole-pieces, a standard provided with a pair of forwardly extending arms, bearing-lugs connected with said arms, an oscillatory spindle mounted between said bearing-lugs, coil-supporting arms extending laterally on opposite sides of said spindle, a wire-wound coil connected with each coil-supporting arm, each coil being movably disposed in a space between each pair of pole-pieces, a forwardly extending arm connected with said spindle, a stirrup-shaped member connected with said arm, a spindle oscillatorily mounted in said stirrup-shaped member, an oscillatory index hand, and means between said spindle and said index-hand.

7. In an electric measuring instrument, a pair of horse-shoe magnets, one of said magnets being larger than the other magnet, the smaller magnet being disposed between the pole-arms of the larger magnet, pole-pieces carried by the respective pole-arms of said magnets, said pole-pieces being arranged in pairs and having a space between each pair of said pole-pieces, a standard provided with a pair of forwardly extending arms, bearing-lugs connected with said arms, an oscillatory spindle mounted between said bearing-lugs, coil-supporting arms extending laterally on opposite sides of said spindle, a wire-wound coil connected with each coil-supporting arm, each coil being movably disposed in a space between each pair of pole-pieces, a forwardly extending arm connected with said spindle, a stirrup-shaped member connected with said arm, a spindle oscillatorily mounted in said stirrup-shaped member, an oscillatory index-hand, and a spiral spring between said spindle and said index-hand for actuating said index-hand.

8. An electric measuring instrument comprising a base-plate, a standard mounted upon said base-plate, a pair of horse-shoe magnets secured upon opposite sides of said standard, a plate mounted upon said standard, a supporting member connected with said plate, a bracket upon said supporting member, said bracket being provided with a pair of arms, bearing-plugs connected with said arms, a spindle oscillatorily mounted between said plugs, an index hand carried by said spindle, and means for producing the oscillatory movements of said spindle and index-hand.

9. An electric measuring instrument comprising a base-plate, a standard mounted upon said base-plate, a pair of horse-shoe magnets secured upon opposite sides of said standard, a plate mounted upon said standard, a supporting member connected with said plate, a bracket upon said supporting member, said bracket being provided with a pair of arms, bearing-plugs connected with said arms, a spindle oscillatorily mounted between said plugs, an index hand carried by said spindle, a second standard mounted upon said base-plate, a pair of forwardly extending arms connected with said standard, bearing-plugs connected with said last-mentioned arms, a spindle oscillatorily mounted between said last-mentioned bearing-plugs, an arm extending from said last-mentioned spindle, means for actuating said spindle and its arm, and means between said arm and said index-hand for actuating said index hand.

10. An electric measuring instrument comprising a base-plate, a standard mounted upon said base-plate, a pair of horse-shoe magnets secured upon opposite sides of said standard, a plate mounted upon said standard, a supporting member connected with said plate, a bracket upon said supporting member, said bracket being provided with a pair of arms, bearing-plugs connected with said arms, a spindle oscillatorily mounted between said plugs, an index hand carried by said spindle, a second standard mounted upon said base-plate, a pair of forwardly extending arms connected with said standard, bearing-plugs connected with said last-mentioned arms, a spindle oscillatorily mounted between said last-mentioned bearing-plugs, an arm extending from said last-mentioned spindle, means for actuating said spindle and its arm, and a spiral spring between said arm and said index hand for actuating said index hand.

In testimony, that I claim the invention set forth above I have hereunto set my hand this 26th day of September, 1910.

JOHN L. ZANDER.

Witnesses:
FREDK. C. FRAENTZEL,
FREDK. H. W. FRAENTZEL.